July 30, 1957

J. A. C. YULE 2,801,279

ELECTRO-OPTICAL SYSTEM FOR PRODUCING OUTLINE
PICTURES FROM CONTINUOUS TONE ORIGINALS

Filed Oct. 27, 1950

JOHN A. C. YULE
INVENTOR

BY Daniel J. Mayne
Lee H. Kaiser
ATTORNEYS

July 30, 1957  J. A. C. YULE  2,801,279
ELECTRO-OPTICAL SYSTEM FOR PRODUCING OUTLINE
PICTURES FROM CONTINUOUS TONE ORIGINALS
Filed Oct. 27, 1950  3 Sheets-Sheet 2

JOHN A. C. YULE
INVENTOR

BY Daniel I. Mayne
Lee H. Kaiser
ATTORNEYS

July 30, 1957  J. A. C. YULE  2,801,279
ELECTRO-OPTICAL SYSTEM FOR PRODUCING OUTLINE
PICTURES FROM CONTINUOUS TONE ORIGINALS
Filed Oct. 27, 1950  3 Sheets-Sheet 3

JOHN A. C. YULE
INVENTOR.

BY

ATTORNEYS though it is only a slight change, provided it is not a gradual one, the line is produced. -->

United States Patent Office 2,801,279
Patented July 30, 1957

2,801,279

ELECTRO-OPTICAL SYSTEM FOR PRODUCING OUTLINE PICTURES FROM CONTINUOUS TONE ORIGINALS

John A. C. Yule, Rochester, N. Y., assignor to Eastman Kodak Company, Rochester, N. Y., a corporation of New Jersey Application October 27, 1950, Serial No. 192,462

7 Claims. (Cl. 178—6.7)

This invention relates to electro-optical systems for the reproduction of pictorial representations, and more particularly to systems for converting continuous tone photographs to outlines. In my U. S. Patent 2,455,849 I describe a photographic process for obtaining an outline effect from a continuous tone record by employing a 100 percent mask, i. e., one whose contrast or density range is equal to that of the record; the mask is unsharp or is used unsharply.

It is an object of the present invention to provide an electro-optical method and apparatus for producing an outline picture, positive or negative, from a continuous tone photograph. It is a particular object of the invention to provide a method of doing this which will eliminate the necessity of making a mask of the continuous tone transparency and exposing a photosensitive material in an unsharp manner through the transparency and the mask in combination. The resulting outline picture resembles a fine etching or engraving. The outline occurs wherever there is a sharp change in density in the original; even though it is only a slight change, provided it is not a gradual one, the line is produced.

According to the invention an outline image is made from a continuous tone record by scanning the record with an electro-optical system which produces an electric signal whose intensity is proportional to the density gradient, i. e., rate of change of density with distance, in the record, and utilizing only intensities of the electric signal above a predetermined magnitude to control the exposure of a photosensitive layer in synchronism with the scanning of the record. An outline effect is produced only where the density gradient in the record is greater than a predetermined value. In one embodiment of the invention an enlarged image of a scanning area of a continuous tone record is projected upon a plurality of outer photoelectric cells surrounding a central photoelectric cell and connected in an electrical circuit whose output is dependent upon the differences in the luminous flux striking the cells. The output of the circuit is zero when the light intensity received by all the cells is the same. However, when the intensity of light striking one of the outer cells is greater than the intensity of light striking the central photoelectric cell, the circuit delivers an output voltage proportional to this difference in intensity, i. e., to the maximum of the responses of the outer cells. This output voltage is utilized to operate a light valve which controls the intensity of a scanning beam for exposing a photosensitive layer in synchronism with the scanning of the record. Variation in the intensity of the scanning beam exposing the photosensitive layer occurs whenever the area being scanned in the continuous tone record contains a sharp change in density. In another embodiment the continuous tone record is scanned with a scanning spot which is vibrated transversely of the scanning line at a high frequency, and the scanning beam as modified by the record is directed to a single photoelectric cell which is connected to the primary of a transformer. The electromotive force generated in the transformer secondary is utilized to operate a light valve for exposing a photosensitive layer in synchronism with the scanning of the record. The electromotive force generated in the secondary of the transformer is proportional to the rate of change of magnetic flux in the transformer core. The transformer thus in effect differentiates the response of the photoelectric cell, and variation in separation of the ribbons of the light valve occurs only where there is a definite limiting density gradient in the continuous tone record. The periodic shifting of the scanning beam laterally of the direction of scanning allows reproduction in outline of density changes both parallel to and perpendicular to the direction of scanning.

In an ordinary photograph the principal subject is usually photographed sharply with the background out of focus. The out-of-focus details of the background are blurred so that there are no sharp changes in density in the background portions of the photograph. The present invention produces an outline effect only where sharp details exist. Therefore in some subjects the blurred background is not reproduced at all and the net result is an outline reproduction of the principal subject only. Obviously, there are many ways in which this feature can be put to use when making illustrations. The operator in making an original photograph no longer has to worry about the background objects provided they are sufficiently out of focus so as not to be reproduced.

The continuous tone record to be reproduced should thus be as sharp as possible. However, the rate of change of density with distance, or "density gradient," in the record which is reproduced is readily controlled by adjustment of the sensitivity of the electro-optical system, by variation of the amplitude or frequency of vibration of the scanning spot transversely of a scanning line.

Other objects and advantages of the invention will be apparent from the following description when read in connection with the accompanying drawings in which.

Figure 4:
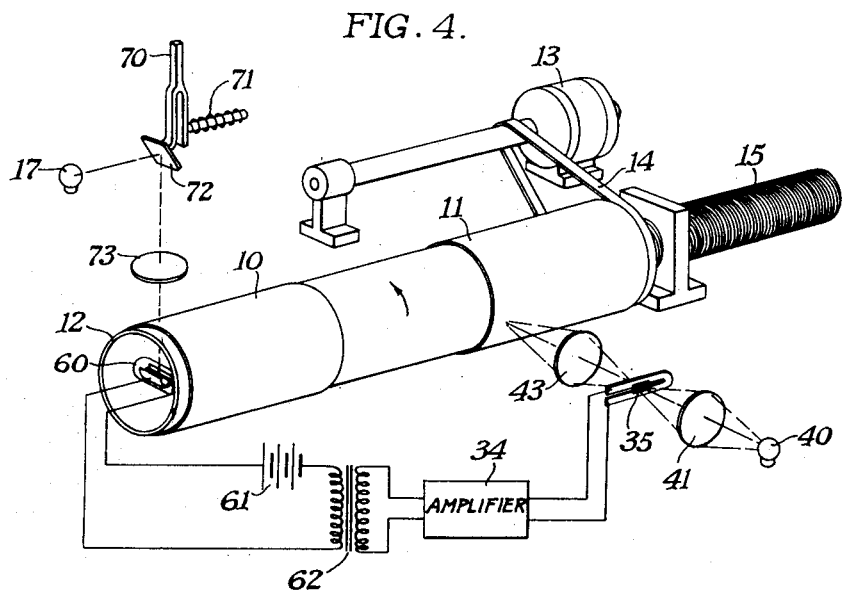
Figure 5:
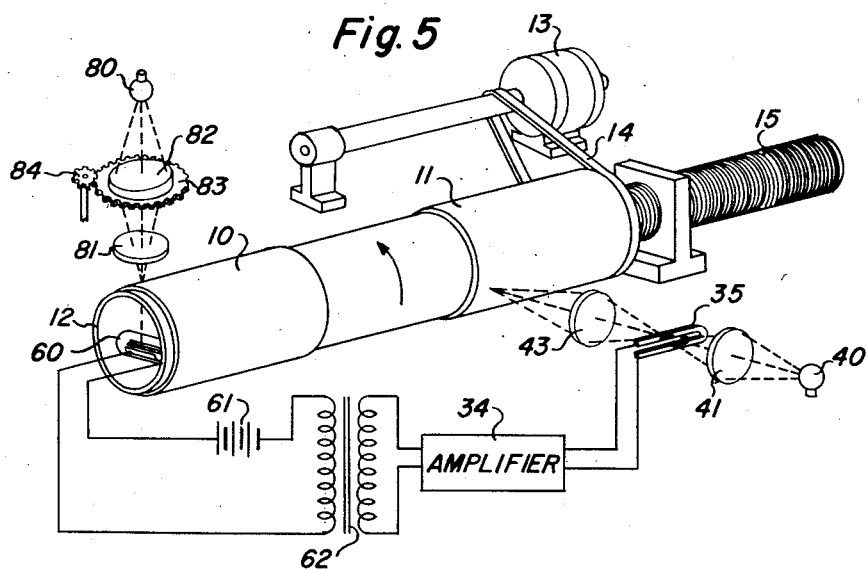

Fig. 4 similarly shows an embodiment which produces an outline effect wherever such density change is either parallel to or perpendicular to the direction of scanning; and Fig. 5 illustrates means of imparting a high frequency circular motion to a scanning spot as it traverses a scanning line.

Figure 1:
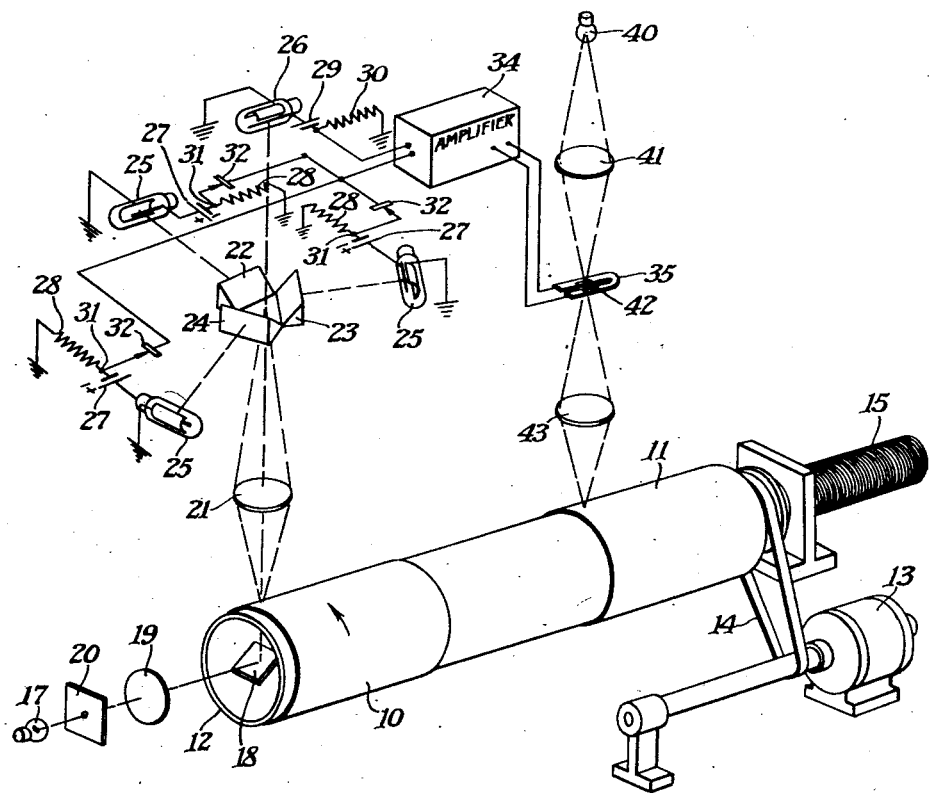
Fig. 1 is a schematic perspective view of one embodiment of the invention.
Figure 2:
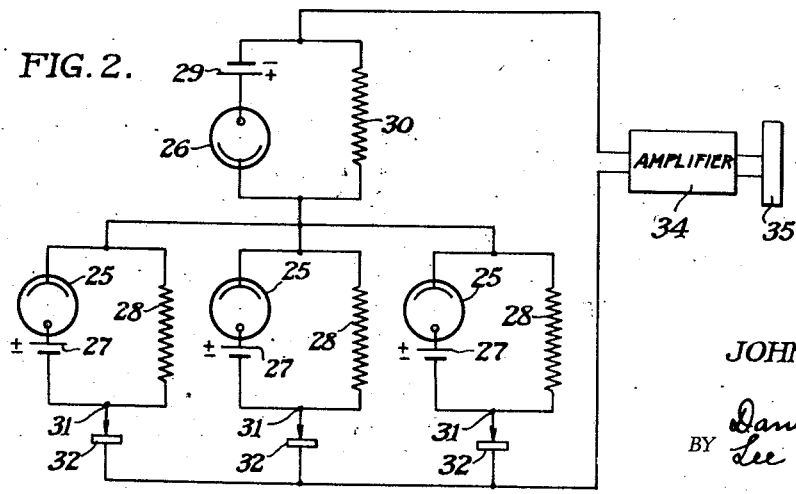
Fig. 2 shows the electric circuit of this embodiment with the symbols in a more conventional arrangement.

In Fig. 1 a continuous tone record 10 and a photosensitive layer 11 are mounted upon a transparent scanning drum 12 which is driven from a motor 13 by a belt 14. The drum 12 is also provided with a lead screw 15 to provide longitudinal movement thereof. Light from a lamp 17 is directed against the inner periphery of the drum 10 by an optical system comprising a mirror 18, mounted within and oblique to the axis of the drum 12, and a lens 19. The area illuminated is confined (by a mask 20) to a scanning spot slightly larger than and including a spot representative of the finest detail to be resolved. Light from the scanning spot as modified by the record 10 is focused into an enlarged image by an optical system shown as a double convex lens 21, and three right-angle reflecting prisms 22, 23, and 24 are disposed in the image plane so that their inner edges form an equilateral triangle. The prisms each reflect a different portion of the light from the enlarged image into a separate outer photoelectric cell 25. Light from the central portion of the image passes through the equilateral triangle formed by the prisms 22, 23, and 24, and strikes a central photoelectric cell 26. The outer photoelectric cells 25 are displaced 120° apart in a circle with the photoelectric cell 26 at the center. The central photoelectric cell 26 receives light from the central portion of the scanning spot, while the outer photoelectric cells 25 receive light from the rest of the spot.

The four photoelectric cells 25 and 26 are connected in an electrical circuit whose output depends upon the differences in light received by the cells. This electrical circuit has zero output when equal light intensities are incident upon all four photoelectric cells. Batteries 27 and resistances 28 are respectively connected in series with the outer photoelectric cells 25. Similarly, a battery 29 and a resistance 30 are connected in series with the central photoelectric cell 26. All the batteries 27 and 29 are of equal voltage; similarly, all of the resistances 28 and 30 are effectively equal, adjustment being made if necessary to compensate for variations in the photocell sensitivities. Since the current flowing through a photoelectric cell is a direct measurement of the intensity of the light incident upon it, equal currents will flow in the resistances 28 and 30 when the area of the record 10 being scanned has uniform density i. e., when equal light intensities strike all four photoelectric cells 25 and 26.

The cathodes of the four photoelectric cells 25 and 26 are commoned, and the junctions 31 of the batteries 27 with the resistances 28 respectively are commoned through rectifiers 32. The maximum of the voltages developed across the three resistances 28 opposes the voltage developed across the resistance 30. The inclusion of rectifiers 32 permits the maximum of the voltages developed across the resistances 28, i. e., the voltage developed across the one of the resistances 28 which is in series with the one of the outer cells 25 receiving the most light, to oppose the voltage developed across the resistance 30 by the current through the central photoelectric cell 26. Omission of the rectifiers, i. e., connecting the three photoelectric cell series circuits in parallel, results in a voltage across the three paralleled circuits which is the average of the voltages developed in the resistances 28.

The rectifiers 32 are connected to oppose the equalization of the voltages developed across the resistances 28 (and thus allow a voltage proportional to the maximum of the responses of the three outer photoelectric cells 25 to oppose the voltage developed across the resistance 30). For example, if the cathodes of all three outer photoelectric cells 25 are at ground potential, and sufficiently more luminous flux is received by one cell than by the other two so that its junction 31 is, for example, ten volts negative with respect to ground while the other two junctions 31 are only, for example, five volts negative with respect to ground, the rectifiers 32 are connected so that electrons from the more negative one of the junctions 31 cannot flow to the more positive junctions 31, and a voltage proportional to the response of the photoelectric cell which is receiving the most light, i. e., ten volts, will oppose the voltage developed across the resistance 30 by current flowing through the central photoelectric cell 26.

Whenever any of the three outer photoelectric cells 25 receives more luminous flux than the central photoelectric cell 26, a voltage is produced which, after suitable amplification by the amplifier 34, is used to control the separation of ribbons of a ribbon type light valve 35. Whenever the same luminous flux strikes all four photoelectric cells 25 and 26, i. e., when all points of the area being scanned by the scanning spot are of equal density, the voltage developed across the resistance 30 is equal and opposite to the voltages developed across the resistances 28, and the input to the amplifier 34 is zero. If the area being scanned by the scanning spot includes a change of density, the luminous flux received by one of the three photoelectric cells 25 is greater than the light received by the central cell 26 when light from the denser area is incident upon the central cell 26 and light from the more transparent area strikes at least one outer cell 25. The maximum of the voltages developed across the resistances 28 opposes the voltage developed across the resistance 30, and the differential voltage as amplified by the amplifier 34 operates a light valve 35 which controls the exposure of the photosensitive layer 11 in synchronism with the scanning of the continuous tone record 10. Sufficient voltage is produced to separate (or close) the ribbons of the light valve 35 whenever the scanning spot traverses a predetermined density gradient in the record 10. A light source 40 is focused by an optical system 41 on the aperture 42 of the ribbon type light valve 35. The light from the valve 35 is refocused by an optical system 43 on the photosensitive layer 11. The gain of the amplifier 34 controls the minimum differential voltage necessary to separate (or close) the ribbons of the light valve 35 and thus predetermines the density gradient in the record 10 which will produce an outline effect in the reproduction. This gain permits control of the diffuseness in the continuous tone record, i. e., the limiting abruptness of density change, that is reproduced in outline, e. g., a greater gain will be required when it is desired to outline slightly diffuse details in the reproduction than when the blurred background portions of a photograph are not to be printed in outline.

If a multicolored original is to be reproduced in outline, the brightness of the scanning beam incident on the cells may be constant in scanning an area of uniform density which varies in color. Reproduction in outline of changes in color simultaneously with outlining of changes in density may be accomplished by inserting a color filter in the scanning beam. The effect obtained by inserting a yellow filter in the scanning beam gives a more interesting effect than that obtained by utilizing the photoelectric system illustrated in Fig. 1 to distinguish brightness difference only. A photocell filter combination matching the response of the human eye is useful for recording only changes which appear as brightness changes.

Since the photoelectric cells 25 are arranged in a circle around the central photoelectric cell 26, the ribbons of the light valve 35 are actuated whenever the area being scanned contains an abrupt change in density either parallel to or transverse of the direction of scanning, and the photosensitive layer 11 when developed in the usual manner has an outline effect wherever there is a sharp change in density in the record 10. Since the resulting voltage can be utilized to either open or close the ribbons of the light valve 35, the photosensitive layer 11, when developed, may have a white outline on a black background or a black outline on a white background.

Alternatively, the central photoelectric cell 26 may be surrounded by four, five, or any desired number of photoelectric cells. The electric circuit illustrated is merely illustrative of the method involved, and various modifications of the circuit shown as well as entirely different circuits may be constructed whose output depends on the differences in the light received by the several photoelectric cells. Hall and Morse, for example, in U. S. Patent 2,231,668, disclose a circuit for selecting the maximum of three electrical energies which is readily adaptable to the selection of a voltage proportional to the response of the outer photoelectric cell 25 which receives the most light.

Figure 3:
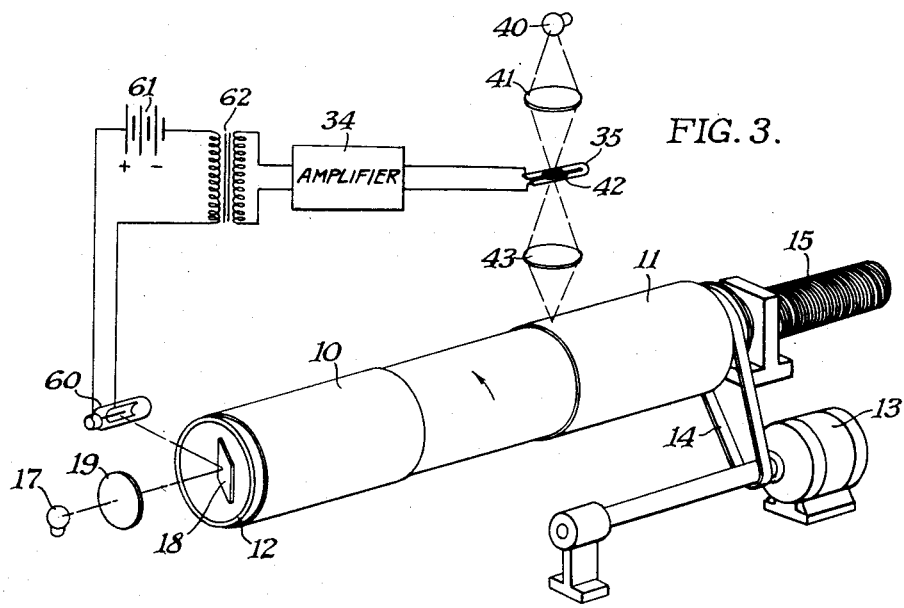
Fig. 3 shows an alternative form of the invention which produces an outline effect when the density change in the continuous tone record is parallel to the direction of scanning.

Fig. 3 illustrates an embodiment of the invention which utilizes the principle that the electromotive force generated in the secondary winding of a transformer is proportional to the rate of change of magnetic flux in the transformer core to obtain an outline effect in reproduction only where there is a predetermined density gradient in the continuous tone record being scanned. A continuous tone record 10 and a photosensitive layer 11 are mounted on a driven transparent scanning drum 12 and a scanning spot is projected upon the record 10 in exactly the same manner as described for embodiment of Fig. 1, and, consequently, the same reference characters have been assigned to identical parts. Light from the scanning spot as modified by the record 10 is accepted by a single photoelectric cell 60 which, for simplicity, is shown in series with a battery 61 and the primary winding of a transformer 62. The electromotive force generated in the secondary winding of the transformer 62 is proportional to the rate of change or flux in the transformer core. Since the drum 12 is driven at a constant angular velocity, in effect the transformer differentiates the density, i. e., opacity, with respect to distance in the record 10. The electromotive force generated in the secondary of the transformer 62 as amplified by the amplifier 34 operates a light valve 35 which controls the exposure of the photosensitive layer 11 in exactly the same manner as described for the embodiment of Fig. 1. No electromotive force is generated in the secondary of the transformer 62 when the scanning spot is traversing areas of uniform density in the continuous tone record 10. The intensity of light striking the photoelectric cell 60 varies whenever the elemental scanning spot scans a change in density in the record 10. Variation in the response of the photoelectric cell 60 generates an electromotive force in the secondary of the transformer 62 which, when amplified by the amplifier 34, operates the light valve 35 for controlling the exposure of the photosensitive layer 11. The gain of the amplifier 34 controls the minimum voltage generated in the secondary of the transformer 62 necessary to separate (or close) the ribbons of the light valve 35, and an outline is thus produced in the developed layer 11 wherever there is a predetermined density gradient in the record 10 parallel to the direction of scanning.

The form of the invention illustrated in Fig. 4 is substantially identical in operation with the embodiment illustrated in Fig. 3 except that an outline occurs in the reproduction wherever there is a sharp change in density in the continuous tone record either parallel to or transverse of the direction of scanning. The photoelectric cell 60 is disposed within the transparent scanning drum 12, and the means for projecting a scanning spot on the record 10 is positioned externally of the drum 12. A mirror 72 is mounted on a continuously vibrating tuning fork 70 which is actuated by the magnetic flux established by the flow of a periodically interrupted magnetizing current in the coil 71. The mirror 72 is oblique to the optic axis of a lens 73 which focuses the light from the lamp 17 as reflected by the mirror 72 into an elemental scanning spot on the record 10. The mirror 72 vibrates in a direction parallel to the axis of the drum 12 and is thus adapted to periodically shift the scanning spot in a direction perpendicular to a scanning line at a frequency determined by the natural period of the tuning fork 70 and the frequency of interruption of the magnetizing current flowing in the coil 71. The resulting path of the scanning spot on the record 10 resembles a constant amplitude carrier wave of electrical energy. Variations in the response of the photoelectric cell 60 occur whenever the scanning spot traverses changes in density in the record 10 either parallel to or lateral of the direction of scanning.

An outline effect is thus produced in the reproduction where sharp changes in density occur in the continuous tone record in either of two directions at right angles to each other. This assures more accurate reproduction in outline than the system of Fig. 3. For example, scanning of density changes parallel to the direction of scanning only may fail to outline the straight edge of an area of constant density in the continuous tone record when this edge is parallel to the direction of scanning. In one scanning line the spot may be entirely in the more dense area, and in the succeeding line the spot may travel entirely in the more transparent area. Since the spot does not scan a change of density parallel to a scanning line, the system of Fig. 3 fails to reproduce an outline along this straight edge. Such failures of reproduction are prevented in the embodiment of Fig. 4 wherein the scanning spot is vibrated at a high frequency transversely of the scanning line. In addition to the use of a high pass filter as hereinbefore described and the gain of the amplifier 34 as means for controlling the limiting diffuseness that is to be outlined, either the amplitude or the frequency of vibration of the scanning spot transversely of a scanning line may be varied to regulate this limiting abruptness of density change that is to be reproduced.

Alternatively, a small diameter, high frequency circular motion can be imparted to the scanning spot as it traverses a scanning line to obtain reproduction in outline of sharp changes in all directions in the continuous tone record. One system of imparting a circular motion to the scanning spot utilizes a rotating optical refracting wedge in the scanning beam as shown in Fig. 5. Light from a lamp 80 is focused by a lens 81 into a scanning spot or the continuous tone record 10. An optical wedge 82 in the scanning beam is mounted centrally in a circular frame 83 having spur gear teeth cut in the circumference thereof which mesh with a pinion 84 to rotate the wedge 82 at a high speed. Rotation of the wedge 82 causes the scanning spot to follow a circular path of the record 10. Alternatively, a rotating opaque disk having a single transparent aperture therein which is located away from the center of rotation may be placed in the scanning beam to impart a rotating motion to the scanning spot.

I claim:

1. An electro-optical system for producing an outline picture from a single continuous tone record including means comprising a scanning beam for scanning the single continuous tone record, elemental area by elemental area, means responsive solely to differences in the intensity of the scanning beam as modified by adjacent areas of the record for establishing an electric signal when the density gradient between such areas in the single record exceeds a predetermined value, and means for exposing a photosensitive layer to a scanning beam whose intensity is controlled by said last-named means.

2. An electro-optical system for producing an outline picture from a single continuous tone record comprising means including a scanning beam for scanning the record and means for periodically shifting the scanning spot formed on said record by said beam transversely of the direction of scanning, photoelectric means responsive to the luminous intensity of the scanning beam as modified by the record for establishing an electric signal corresponding thereto and the value of which varies solely in accordance with the variations in the density of said record, a transformer having the primary winding thereof receiving a unidirectional electric current proportional to said electric signal, and means controlled by the electro-motive force generated in the secondary winding of said transformer during a change in said primary current induced by a change in the density of the record being scanned for exposing a photosensitive layer in synchronism with the scanning of the record whereby only density gradients appearing in said record will be photographically outlined by the exposed areas of said layer.

3. An electro-optical system for producing an outline picture from a continuous tone record comprising a driven scanning drum adapted to carry the continuous tone record and a photosensitive layer, a scanning light source for projecting a scanning beam upon the record, means for continuously vibrating the scanning spot formed on said record by said beam across the direction of scanning at a high frequency, means including a photoelectric cell adapted to receive the scanning beam as modified by the record for producing a unidirectional current, the value of which at any time corresponds to the density of that portion of the record then being scanned and varies only in response to density gradients encountered during scanning; a transformer having its primary winding receiving said current, and a light valve for controlling the intensity of a scanning beam for exposing the photosensitive layer, said light valve being controlled by the electromotive force generated in the secondary winding of said transformer whereby said light valve is actuated only during the scanning of density changes in said record.

4. An electro-optical system for producing an outline picture from a continuous tone record comprising a driven scanning drum adapted to carry the continuous tone record and a photosensitive layer; a scanning light source for projecting a scanning beam upon the record, means for imparting a small diameter, high frequency circular motion to the scanning spot formed on said record by said beam as it scans, means including a photoelectric cell adapted to receive the scanning beam as modified by the record for producing a unidirectional current, the value of which at any time corresponds to the density of that portion of the record then being scanned and varies only in response to density gradients encountered during scanning, a transformer having its primary winding receiving said current, and a light valve for controlling the intensity of a scanning beam for exposing the photosensitive layer, said light valve being controlled by the electromotive force generated in the secondary winding of said transformer whereby said light valve is actuated only during the scanning of density changes in said record.

5. An electro-optical system for producing an outline picture from a continuous tone record, comprising a central photoelectric cell, a plurality of outer photoelectric cells surrounding the central cell, a plurality of effectively equal resistances, one in series with each cell, means for scanning the record with a scanning spot, means for imaging the scanning area of the record covered by said spot, upon the central and the outer photoelectric cells whereby each cell receives light from a different portion of the area, means for selecting one of the extremes of the voltages developed across the resistances in series with the outer cells, and means controlled by the difference between said extreme voltage and the voltage developed across the resistance in series with the central photoelectric cell for exposing and scanning a photosensitive layer in synchronism with the scanning of the record.

6. An electro-optical system for producing an outline from a single continuous tone record, comprising scanning means for scanning said record, elemental area by elemental area, and deriving an electric signal whose intensity is proportional only to the density gradient between adjacent elemental areas encountered during scanning of the record, a light valve for controlling the exposure of a photosensitive layer in synchronism with the scanning of the record, and means responsive only to intensities of the electric signal above a predetermined magnitude for actuating said light valve, whereby the reproduction contains only an outline of abrupt changes of density in the record.

7. Facsimile apparatus comprising scanning means for deriving an electric signal whose intensity is proportional only to the density gradient between adjacent elemental areas of a single continuous tone photograph being scanned; a scanning recorder, and means responsive only to intensities of the electric signal above a predetermined magnitude for actuating said recorder, whereby a resulting record is in the form of an outline picture delineating the contour of a predetermined density gradient in the continuous tone photograph.

References Cited in the file of this patent
UNITED STATES PATENTS

| 1,719,621 | Pearne | July 2, 1929 |
| 1,923,208 | Howey | Aug. 22, 1933 |
| 1,943,900 | Müller | Jan. 16, 1934 |
| 2,000,694 | Felix | May 7, 1935 |
| 2,026,330 | Tauschek | Dec. 31, 1935 |
| 2,115,894 | Watson | Aug. 3, 1938 |
| 2,551,726 | Cooley | May 8, 1951 |